United States Patent
Magliocca et al.

(10) Patent No.: US 7,908,932 B2
(45) Date of Patent: Mar. 22, 2011

(54) MAGNETO-INDUCTIVE MEASURING TRANSDUCER

(75) Inventors: Antonio Magliocca, Basel (CH); Werner Wohlgemuth, Seewen (CH)

(73) Assignee: Endress + Hauser Flowtec AG, Reinach (CH)

( * ) Notice: Subject to any disclaimer, the term of this patent is extended or adjusted under 35 U.S.C. 154(b) by 83 days.

(21) Appl. No.: 12/226,612

(22) PCT Filed: Apr. 27, 2007

(86) PCT No.: PCT/EP2007/053598
§ 371 (c)(1),
(2), (4) Date: Jun. 19, 2009

(87) PCT Pub. No.: WO2007/125018
PCT Pub. Date: Nov. 8, 2007

(65) Prior Publication Data
US 2009/0308175 A1   Dec. 17, 2009

(30) Foreign Application Priority Data

Apr. 27, 2006 (DE) ............ 10 2006 020 265
Oct. 6, 2006 (DE) ............ 10 2006 047 781

(51) Int. Cl.
*G01F 1/58* (2006.01)
(52) U.S. Cl. .................................................. 73/861.12
(58) Field of Classification Search .. 73/861.08–861.12, 73/861.355, 861.356, 861.357
See application file for complete search history.

(56) References Cited

U.S. PATENT DOCUMENTS

| 4,186,600 | A | 2/1980 | Appel |
| 5,121,640 | A | 6/1992 | Van der Pol |
| 6,047,718 | A * | 4/2000 | Konsky et al. ............... 137/1 |
| 6,883,387 | B2 * | 4/2005 | Bitto et al. ............ 73/861.355 |
| 2005/0000300 | A1 | 1/2005 | Zingg |

FOREIGN PATENT DOCUMENTS

| DE | 946 488 | 8/1956 |
| DE | 2 040 682 | 2/1972 |
| DE | 30 06 723 A1 | 4/1981 |
| DE | 30 29 791 A1 | 3/1982 |
| GB | 2 402 219 A | 12/2004 |
| JP | 0808 2539 | 3/1996 |

* cited by examiner

*Primary Examiner* — Jewel Thompson
(74) *Attorney, Agent, or Firm* — Bacon & Thomas, PLLC (57) ABSTRACT

A measuring transducer including a measuring tube for conveying a fluid; a measuring electrode arrangement for registering electric voltages produced in the flowing fluid; as well as a magnetic field system situated externally on the measuring tube for producing a magnetic field at least partially passing through the measuring tube as well as the therein conveyed fluid during operation, for inducing an electric field in the flowing fluid, wherein the magnetic field system has at least one field coil, through which an electrical exciter current flows at least at times during operation. A coil holder is also including serving for holding the at least one field coil externally on the measuring tube, wherein the measuring tube and coil holder are connected joint-freely with one another, so that the coil holder is embodied as an integral component of the measuring tube.

27 Claims, 5 Drawing Sheets

MAGNETO-INDUCTIVE MEASURING TRANSDUCER

TECHNICAL FIELD

The invention relates to a magneto-inductive measuring transducer having a measuring tube, through which electrically conductive fluid to be measured flows.

BACKGROUND DISCUSSION

As is known, by means of flow measuring devices containing a magneto-inductive measuring transducer, the volume flow of an electrically conductive fluid flowing through a measuring tube of such measuring transducer in a flow direction can be measured. To this end, there is produced at the measuring transducer, by means of a magnetic circuit arrangement electrically connected to an exciter-electronics of the flow measuring device, a magnetic field of highest possible density, passing through the fluid within a measurement volume at least sectionally perpendicularly to the flow direction and closing on itself essentially outside of the fluid. The measuring tube is, therefore, usually made of non-ferromagnetic material, in order that the magnetic field not be unfavorably influenced during measurement. As a result of movement of free charge carriers of the fluid in the magnetic field, there is produced in the measurement volume, according to the magneto-hydrodynamic principle, an electrical field, which extends perpendicularly to the magnetic field and perpendicularly to the flow direction of the fluid. By means of at least two measuring electrodes arranged spaced from one another in the direction of the electrical field and by means of an evaluating electronics of the flow measuring device connected to these electrodes, thus, an electric voltage induced in the fluid is measurable. This voltage is a measure for the volume flow. The measuring transducer is so constructed, that the induced electrical field closes on itself outside of the fluid practically exclusively via the evaluating electronics connected to the measuring electrodes. For tapping the induced voltage, for example, fluid-contacting, galvanic, or fluid non-contacting, capacitive, measuring electrodes can serve.

Due to the required high mechanical stability for such measuring tubes, these are composed, preferably, of an outer, especially metal, support tube of predeterminable strength and size, which is coated internally with an electrically non-conductive, insulating material of predeterminable thickness, the so-called liner. For example, described in WO-A 05/057141, WO-A 04/072590, US-A 2005/0000300, U.S. Pat. No. 6,595,069, U.S. Pat. No. 5,280,727, U.S. Pat. No. 4,679,442, U.S. Pat. No. 4,253,340, U.S. Pat. No. 3,213,685 or JP-Y 53-51 181, in each case, are magneto-inductive measuring transducers employing a measuring tube joinable pressure-tightly into a pipeline. The measuring tube has an inlet-side, first end and an outlet-side, second end and is composed of a, most often, non-ferromagnetic support tube as an outer jacket, and a tubular liner accommodated in a lumen of the support tube, composed of an insulating material and serving for guiding the flowing fluid insulated from the support tube. The liner thus serves to guide a fluid e.g. chemically isolated from the support tube. In the case of support tubes of higher electrical conductivity, especially in the case of metal support tubes, the liner, moreover, serves as electrical insulation between the support tube and the fluid, for preventing a short-circuiting of the electrical field via the support tube. By an appropriate design of the support tube, thus implementable is a matching of the strength of the measuring tube to the mechanical loadings present in the respective instance of use, combined with a matching of the liner of the measuring tube to the chemical, especially hygienic, requirements for the respective instance of use. For manufacture of the liner, often applied are the injection-molding or transfer-molding methods. It is, however, also usual, to use a completely prefabricated liner in the support tube. Thus, JP-A 59-137 822 discloses a method, in which the liner is formed by softening a film of synthetic material, or plastic. Usually embedded in the liner, made, most often, of a thermoplastic or thermosetting, synthetic material, is an open-pored, especially metal, support body for stabilizing the liner, such practice being disclosed, for example, also in EP-A 36 513, EP-A 581 017, JP-Y 53-51 181, JP-A 59-137 822, U.S. Pat. No. 6,595,069, U.S. Pat. No. 5,664,315, U.S. Pat. No. 5,280,727 or U.S. Pat. No. 4,329,879. The support bodies are, in each case, accommodated aligned in the lumen of the measuring tube and completely encased by the insulating material, at least on the fluid contacting, inside.

Especially the flow meter disclosed in U.S. Pat. No. 4,253,340 or in WO-A 05/057141 includes, further, a support frame for holding the measuring tube and for holding an electronics housing mechanically connected with the measuring transducer. The electronics housing serves to accommodate the above-mentioned exciter- and evaluating-electronics near to the measuring transducer and to protect it largely from environmental influences. Measuring tube and support frame are, in such case, affixed to one another only on the inlet side and on the outlet side, in each case, over a comparatively short, connection region. Flow measuring devices of the type shown in U.S. Pat. No. 4,253,340 are distinguished, among others, by the fact that they can be constructed very compactly.

For guiding and coupling the magnetic field into the measurement volume, the magnetic circuit arrangement usually includes two coil cores of magnetically conductive material, which are arranged on a periphery of the measuring tube, especially diametrally spaced from one another and having, in each case, a free, terminal face, arranged especially as mirror images relative to one another. The magnetic field is so coupled into the coil cores by means of a coil arrangement connected to the exciter-electronics, that it passes through the fluid flowing between both end faces, at least sectionally, perpendicularly to the flow direction. On its end distal to the end face, each of the coil cores is usually additionally magnetically coupled with at least one, one- or multi-piece, separate element of magnetically conductive material providing back-closure for the field. The field-conducting element extends peripherally to the measuring tube and guides the magnetic field around the outside of measuring tube. In the case of a one-piece, peripheral, back-closing element, such can, in such case, be connected, in each case, with the respective coil core end, for example, by means of screw- and/or, as proposed in WO-A 04/072590, by means of clamp-connections.

Disadvantageous in the case of such construction is, on the one hand, the comparatively large number of individual parts for a single measuring transducer, this working against assembly in as short a time as possible and against simultaneously required, high product quality. On the other hand, it is, in the case of measuring transducers of the described kind, of special interest, to position the field coils precisely, not only in the case of assembly of the measuring transducer, but also to assure with certainty, that their assembled position remains, as much as possible, unchanged, within very narrow limits, for ensuring accuracy of measurement over the entire operating time of the respective measuring transducer. These goals cannot, however, be assured without special measures when using coil cores composed of separate parts and, on occasion, also equally separate, pole shoes. Such special measures would involve considerable extra material- and assembly-complexity in the form of, for example, special abutments or other, supplemental, interlocking mechanisms for the field coils, coil cores, and/or pole shoes.

It is, therefore, an object of the invention to improve measuring transducers of the described kind, such that the number of individual parts required for their manufacture can be reduced in comparison to conventional magneto-inductive measuring transducers. Moreover, the magnetic field system should also be as easy as possible to assemble and, additionally, exhibit a high, long-term stability.

SUMMARY OF THE INVENTION

For achieving the object, the invention resides in a magneto-inductive measuring transducer for a fluid flowing in a pipeline. The transducer includes: A measuring tube for conveying the fluid; a measuring electrode arrangement for registering electric voltages produced in the flowing fluid; as well as a magnetic field system placed on the measuring tube for producing a magnetic field at least partially passing through the measuring tube, as well as through a fluid conveyed therein, during operation, wherein the magnetic field system includes at least one field coil, through which an electrical exciter current flows, at least at times during operation. The measuring transducer of the invention includes, additionally, a coil holder serving for holding the at least one field coil externally on the measuring tube, wherein measuring tube and coil holder are connected joint-freely with one another connected, so that the coil holder is an integral component of the measuring tube.

According to a first embodiment of the invention, it is provided, that the coil holder is composed of a magnetically conductive material. In a further development, the coil holder is embodied, in such case, as a coil core also guiding the magnetic field of the field coil.

According to a second embodiment of the invention, it is provided, that the coil holder has at least one eddy-current reducing, or preventing, air gap. According to a further development of this embodiment of the invention, the at least one air gap provided in the coil holder is so embodied, that it extends essentially perpendicularly to a longitudinal axis of the measuring tube. According to another further development of this embodiment of the invention, the coil holder has a large number of eddy-current reducing, or preventing, air gaps, especially air gaps extending essentially parallel relative to one another. The air gaps can be embodied, for example, in such case, as annular gaps essentially coaxial to one another.

According to a third embodiment of the invention, it is provided, that the at least one coil holder is formed by means of a plurality of projections connected with the measuring tube, especially rod-, sleeve- or lamellar-projections. In the case of this embodiment of the invention, the projections forming the coil holder are spaced from one another, to provide intermediate spaces therebetween, especially intermediate spaces in the form of air gaps.

According to a first further development of the invention, the measuring transducer has, in a transitional region between coil holder and measuring tube, additionally a pole shoe for focusing the magnetic field. This is formed, according to a fourth embodiment of the invention, by means of a local thickening the measuring tube wall, especially a thickening provided externally in the transitional region. Alternatively thereto, or in supplementation thereof, the pole shoe is formed, according to a fifth embodiment of the invention, by means of a local recessing of the measuring tube wall, especially a recessing externally in the transitional region.

According to a second further development of the invention, it is provided, that the magnetic field system further includes at least one, self-closing, field conducting element guiding the magnetic field externally around the measuring tube. In an embodiment of this further development of the invention, it is additionally provided, that the at least one coil holder is also connected with the at least one field conducting element joint-freely.

According to a third further development of the invention, it is provided, that the measuring tube has, on an inlet-side end, a first flange, and, on an outlet-side end, a second flange. In a further development of this embodiment of the invention, each of the two flanges is, likewise, connected joint-freely with the measuring tube.

According to a fourth further development of the invention, it is additionally provided, that the magnetic field system has two, especially essentially equally constructed, field coils, through which an electrical exciter current flows, at least at times, during operation. Therefore, the measuring transducer includes, according to a fifth further development of the invention, a first coil holder for holding a first field coil of the magnetic field system externally on the measuring tube, as well as a second coil holder for holding a second field coil of the magnetic field system externally on the measuring tube. In such case, according to a sixth embodiment of the invention, each of the two, especially essentially equally-constructed, coil holders is embodied as an integral component of the measuring tube and, in each case, connected joint-freely with the measuring tube.

According to a sixth further development of the invention, it is additionally provided, that the measuring tube includes an, especially metal, support tube, which carries the coil holder externally. The support tube is, according to a seventh embodiment of the invention, lined internally with a liner of electrically insulating material, especially a synthetic material, or plastic. Additionally, in such case, according to an eighth embodiment of the invention, it is provided, that the support tube and/or the coil holder are/is composed of a cast metal, especially a cast iron, and/or that the support tube and/or the coil holder are/is composed of a sintered metal, and/or that support tube and coil holder are composed of the same, especially magnetically conductive, material. In a ninth embodiment of the invention, in such case, it is additionally provided, that the support tube has, on an inlet-side end, a first flange and, on an outlet-side end, a second flange. Each of the two flanges can, in turn, be connected joint-freely with the support tube and/or be composed of the same material as the support tube.

A basic idea the invention is to provide an assembly-friendly, especially rapidly, as well as also equally precisely, assemblable, magnetic field system for magneto-inductive measuring transducers, by the feature of providing coil holders on the measuring tube already during the forming of the measuring tube or already during the forming of its support tube, for example, by casting or sintering the coil holders as integral components of the measuring tube or its support tube. On occasion, this idea can be further developed in advantageous manner by providing that, equally, also the at least one field conducting element is connected joint-freely with the at least one coil holder and, as a result, is embodied as an integral component thereof.

An advantage of the invention is that the magnetic field system is, on the one hand, due to the lessening of the number of individual components, easy to assemble, as compared with conventional measuring transducers of the described kind.

Additionally, as a result of the lessening of joints in the magnetic field system of the measuring transducer of the invention as a whole, potential out-coupling locations for stray magnetic fields are reduced. Thus can be obtained, in comparatively simple manner, a largely low loss and, as a result, very efficient, magnetic field system. A further advantage of the invention is additionally to be seen in the fact that, due to the then quite extensive automating of the manufacture of the magnetic field system, particular examples within a production lot, as well as also essentially over the product line, lie within smaller tolerance ranges of one another. Equally, thus, also variations of the magnetic field system with respect to time, especially variations due to slight slipping of the field coils and/or of the field-conducting elements providing back-closure of the magnetic field, and fluctuations in the accuracy of measurement associated therewith, are lessened to a considerable degree.

BRIEF DESCRIPTION OF THE DRAWINGS

The invention and advantageous embodiments will now be explained in greater detail on the basis of the figures of the drawing. Same or similar parts are provided with equal reference characters throughout the figures. In case overview-ability requires, already shown reference characters are omitted in subsequent figures. The figures of the drawing show as follows.

DETAILED DISCUSSION

Figure 1A:
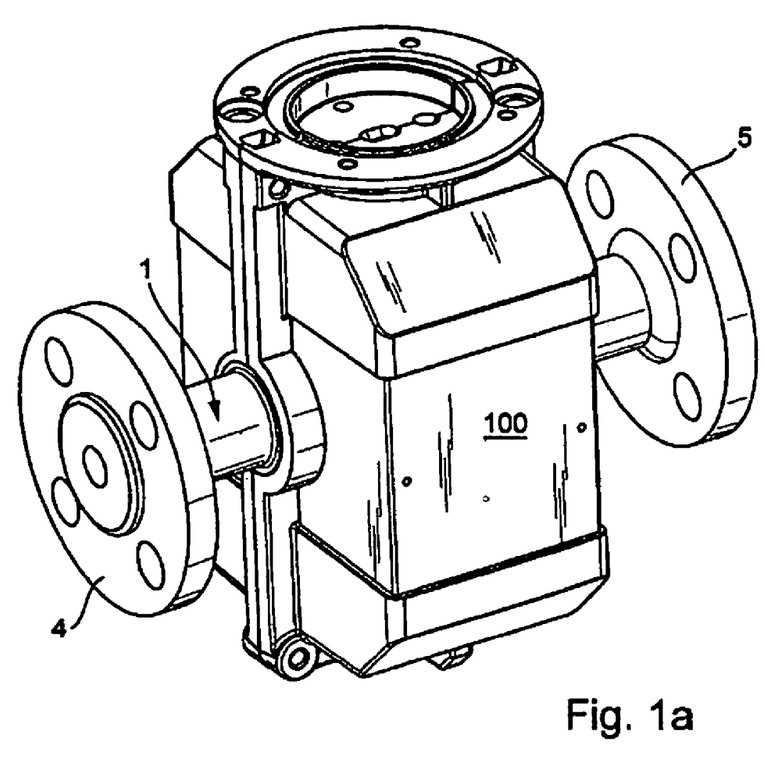
FIGS. 1a-1c schematically, a magneto-inductive measuring transducer in perspective, also partially sectioned or exploded, side views.
Figure 1B:
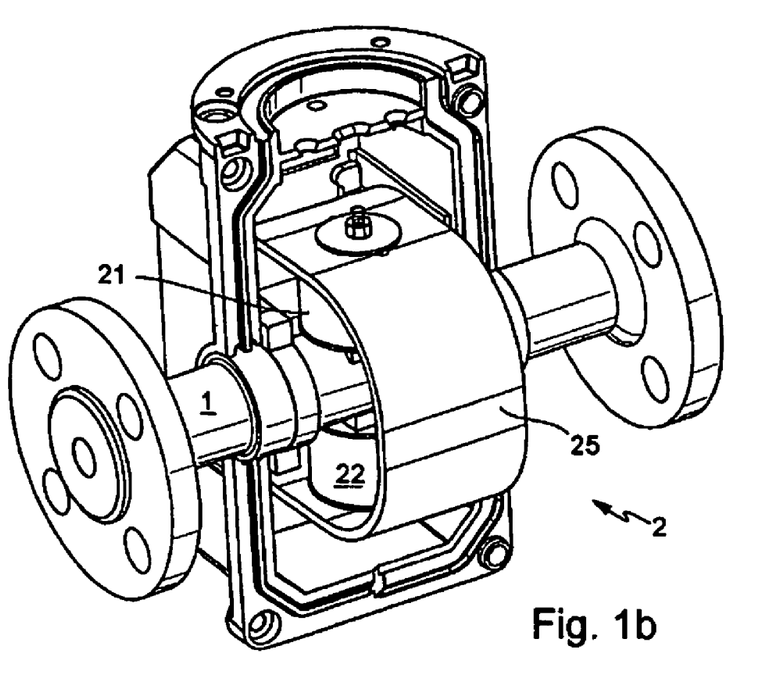
Figure 1C:
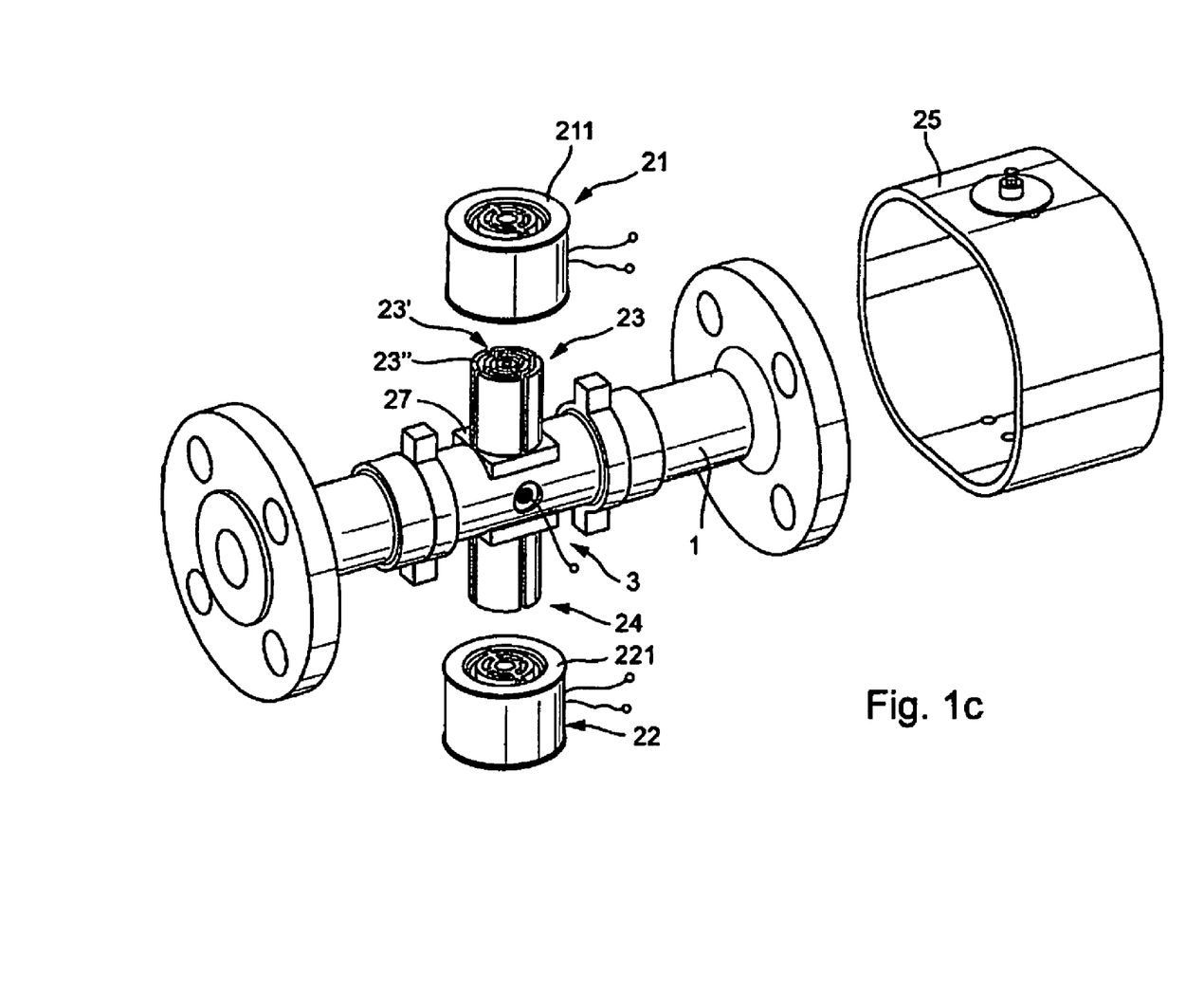

FIGS. 1a, 1b, and 1c show, schematically, a magneto-inductive measuring transducer serving for measuring a fluid flowing in a pipeline. The measuring transducer can, for example, be applied as a primary transducer of an in-line measuring device for measuring flow and/or for measuring conductivity. The measuring transducer includes: A measuring tube 1 of predeterminable shape and size, accommodated at least partially in a transducer housing 100, for conveying the fluid to be measured; a magnetic field system 2 arranged on the measuring tube 1 for producing and guiding a magnetic field required for the measuring and passing sectionally through the fluid conveyed in the measuring tube; as well as a measuring electrode arrangement 3 likewise arranged on the measuring tube 1 for measurement of a voltage induced in the fluid. In advantageous manner, the magnetic field system is so embodied, in such case, that the magnetic field produced therewith passes through the fluid located within the measuring tube at least sectionally perpendicularly to the direction of fluid flow. For pressure-tight joining into the pipeline supplying, and extracting, the fluid, the measuring tube 1—of which an embodiment is shown in different side views in FIGS. 2a, b, c and d—has, in the example of an embodiment shown here, additionally a first flange 4 on a first measuring tube end and a second flange 5 on a second measuring tube end.

For tapping voltages induced in the flowing fluid, the electrode arrangement 3 includes two—here rod-shaped, galvanic—measuring electrodes 31, 32. The measuring electrodes 31, 32 have, here, as schematically illustrated in FIGS. 2c and d, in each case, a measuring electrode head contacting the fluid during operation for tapping the above-mentioned, induced voltage, as well as a measuring electrode shaft, which serves for connecting the sensor arrangement to an evaluating electronics (not shown) of the mentioned, in-line, measuring device. In the example of an embodiment shown here, the two measuring electrodes lie diametrally opposite one another, as is evident from the combination of FIGS. 2a, b, c, d. Of course, they can, however, also, in case necessary, especially in the case of application of more than two measuring electrodes, be so arranged spaced from one another on the measuring tube 1, that they do not lie diametrally opposite one another. This can be the case e.g. when additional measuring electrodes are provided for reference potentials, or, in the case of horizontally installed position of the measuring tube 1, measuring electrodes are provided for monitoring a minimum fill level of fluid in the measuring tube 1. Instead of the galvanic measuring electrodes 31, 32 shown here, also capacitive measuring electrodes can be utilized.

For producing the required magnetic field, the measuring transducer has, placed on the measuring tube 1, additionally a magnetic field system 2 having at least one field coil 21. At least in measuring operation, the at least one field coil 21 is connected with an exciter-electronics (not shown) of the in-line measuring device, and, at least at times, an exciter current fed from the exciter-electronics flows through the at least one field coil 21. Utilizable as exciter-electronics are circuit arrangements known to those skilled in the art or described in the state of the art. In the example of an embodiment shown here, the at least one, here essentially cylindrical, field coil is, as is directly evident from the combination of FIGS. 1b and 1c, formed by means of at least one coil wire wound on an essentially sleeve-like, especially tubular, coil body 211. In case necessary, the wire can, also, be embedded, at least partially, in the coil body, especially when the coil body is formed of electrically insulating material. In order to be able to produce, at least within a predetermined measuring tube region, an essentially rotationally symmetric, magnetic field, the magnetic field system 2 includes, in the example of an embodiment shown here, however, two field coils 21, 22, which lie essentially diametrally opposite to one another and through which, during operation, flows, in each case, at least at times, for example, the same, electrical exciter current. Each of the two, especially essentially equally-constructed, field coils 21, 22 is, as also evident from FIG. 1c, formed by means of a—here essentially sleeve-like or cylindrical—coil body 211, 221, on which, in each case, a coil wire is wound.

For holding the at least one field coil 21 externally on the measuring tube 1, the measuring transducer has, as evident, among others, from FIG. 1c, additionally, arranged externally on the measuring tube, a coil holder 23—here essentially cylindrically formed—extending through the central opening—here formed by means of the sleeve-shaped coil body 211—of the field coil 21. Coil holder 23 can be viewed as a component of the magnet system. As evident from the combination of FIGS. 1b and c, field coil 21 is appropriately pushed onto the coil holder 23, so that the latter is permeated, during operation, by the field lines of the magnetic field extending essentially parallel within the field coil 21. As a result of the fact that measuring tube 1 and coil holder 23 are connected with one another in the aforementioned manner, the magnetic field exits, in such case, via an inner surface of the measuring tube facing the fluid to be measured, out of the magnet system, and couples, finally, correspondingly, into the flowing fluid. In advantageous manner, therefore, the coil holder 23 can serve, at the same time, also as a coil core for the field coil 21 for conducting the magnetic field and, as a result, increasing the inductance of the field coil 21. For such purpose, the coil holder 23, in an additional embodiment of the invention, is made of a magnetically conductive material with a relative permeability essentially greater than one, especially greater than 10. Additionally, it is provided, that also the measuring tube 1 is composed, at least partially, of a magnetically conductive material.

The magnetic field system 2 includes, furthermore, at least one field-conducting element 25 for guiding the magnetic field outside of the measuring tube. Field-conducting element 25 is made of magnetically conductive material and is, as much as possible, low loss magnetically coupled with the at least one field coil 21. For such purpose, the field-conducting element 25 providing magnetic back-closure can be embodied as a self-closing band and/or essentially ring-shaped. Additionally, the at least one field-conducting element can, for example, be manufactured as a single, one-piece, blanked- or blanked/bent-piece of transformer- or dynamo-sheet. Alternatively thereto, at least one field-conducting element can, however, also, be embodied as a one-piece, cast part.

In the example of an embodiment shown in FIGS. 1a-c, the at least one field-conducting element 25, composed, for example, of ferro-magnetic metal, is formed by means of a ring-shaped sheet, which is arranged extending peripherally to the measuring tube 1, especially coaxially to the measuring tube and/or which is of one-piece construction. The ring-shaped sheet contacts the coil holder 23 on its end distal to the measuring tube and is connected, especially releasably connected, there, with the coil holder 23. It is to be noted here, however, that the magnetic field system 2 can include, in addition to the at least one field-conducting element 25, further field-conducting elements, in case required. Additionally, it can be of advantage, that at least one field-conducting element 25 is constructed not as a single formed sheet part, but, instead, as a package of a number of layered, formed, sheet parts electrically insulated from one another, for purposes of suppressing of eddy currents; compare, in this connection, also JP-Y 2-28 406, U.S. Pat. No. 4,641,537 or WO-A 04/072590.

In the case of the measuring transducer of the invention, it is additionally provided, that the coil holder 23 for the at least one field coil 21 is constructed as an integral component of the measuring tube 1. Especially, measuring tube 1 and coil holder 23 are, in such case, connected joint-freely with one another, especially also free of additional weld seams and soldered connections. For implementing a coil holder integrated in such a way into the measuring tube, it can, for example, be cast or sintered together with the measuring tube—completely or at least as concerns the parts directly abutting one another within a transition region. Serving for manufacture of the measuring tube with integrated coil holder can be, for example, melts of magnetically conductive, synthetic material, or plastic, or metal, or also appropriately sinterable, and/or capable of being melted on, granular material and/or powder, wherein applicable as sinter material are e.g. sinterable metals and/or metal oxides or also other suitable ceramic materials.

Figure 2A:
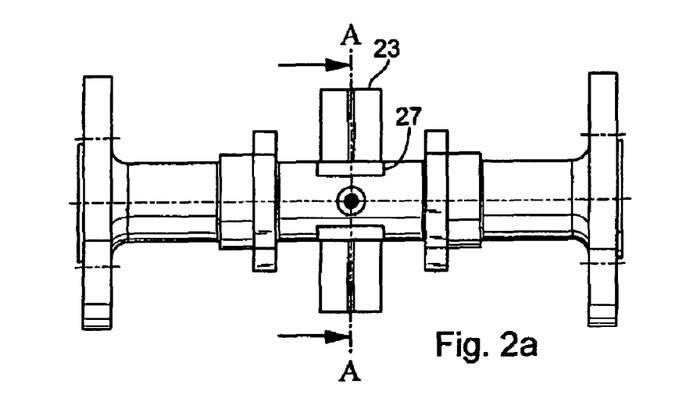
FIGS. 2a-2d schematically, a measuring tube, with coil holders provided thereon, for a measuring transducer according to FIGS. 1a-c.
Figure 2B:
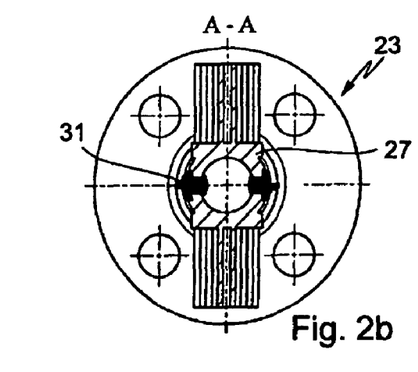
Figure 2C:
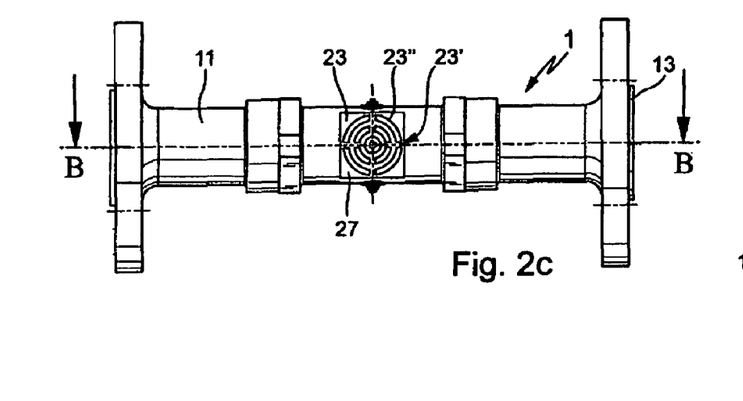
Figure 2D:
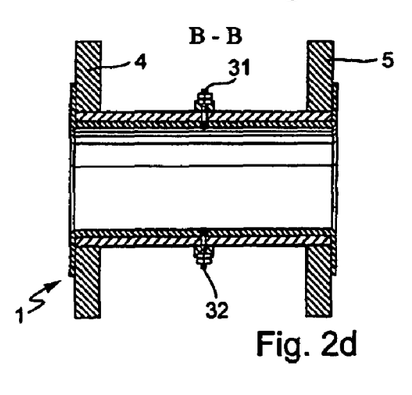

For producing a magnetic field passing through the fluid to be measured predominantly only within a predetermined, compact, measurement volume, there is provided, according to a further development of the invention, externally in a transitional region between coil holder 23 and measuring tube 1, additionally, a local recess in the measuring tube wall and/or, however, also, such as evident especially from the combination of FIGS. 2a, b, c, a local thickening of the measuring tube wall or also of the coil holder 23. In this way, in interplay of coil holder 23 and the thereto adjoining, measuring tube wall, a pole shoe 27 is formed for appropriately focusing the magnetic field, and integrated, practically equally as the coil holder 23, into the measuring tube 1. The pole shoe forming, thickening or recessing can be formed, equally, directly with the manufacture of coil holder and measuring tube, so that the pole shoe is, as a result, connected joint-freely with measuring tube and coil holder and, as a result, equally as the coil holder itself, likewise embodied as an integral component of the measuring tube.

In an additional embodiment of the invention, it is provided, furthermore, that the coil holder 23 has at least one eddy-current reducing, or preventing, air gap 23' extending, especially essentially perpendicularly to a longitudinal axis of the measuring tube 1. In case necessary, the coil holder 23 can, of course, also have, as evident from FIG. 1c or 2a, b, c, a plurality of eddy-current reducing, or preventing, air gaps extending, especially, essentially parallel to one another. The air gaps can, in such case, be constructed, for example, as annular gaps essentially coaxial relative to one another. This can be obtained e.g. by forming the at least one coil holder 23 by means of a plurality of projections 23", especially rod-, sleeve- or lamellar projections 23", connected with the measuring tube, wherein the coil holder forming projections are spaced from one another, such as illustrated in FIG. 1c or also evident from the combination of FIGS. 2a, b, c, to form intermediate spaces spaced laterally from one another. For the above-described case, that the coil holder 23 has air gaps extending parallel relative to one another, struts can be provided, which are appropriately complementary to the air gaps—for example, struts embodied as radial spokes and/or circular rings—in the, as much as possible, electrically insulating, coil bodies of the at least one field coil, so that an additional positioning aid and/or locking for the at least one field coil is provided; compare, in this connection, also FIG. 1c.

In the example of an embodiment shown in FIGS. 2a to d, measuring tube 1 is formed by means of an, especially metal, support tube 11, as well as an inner liner 12 lining such and made of an insulating material, for example, a thermosetting plastic, a thermoplastic or some other synthetic material. Provided for mechanical stabilization of the liner 12 can be, moreover, a support body embedded therein, especially an open-pored and/or tubular, support body. Support tube 11 surrounds, coaxially, the liner 12, having, on occasion, an embedded support body and serves, thus, as an outer, form-giving, as well as form-stabilizing, jacket of measuring tube 1. Liner 12 is, in such case, so embodied that the measuring tube is completely covered by the liner 12 on its inside surface contacted by through-flowing fluid and, thus, for practical purposes, alone the liner 12 is wetted by the fluid flowing through the measuring tube 1; compare, in this connection, also U.S. Pat. No. 3,213,685. On occasion, also the support tube 11 itself can be contacted internally by the material of the liner. In the case of this embodiment of the invention, wherein the measuring tube 1 is formed, among others, by means of the support tube 11, the coil holder 23 is, accordingly, arranged externally on the support tube 11. According to an advantageous further development of this embodiment of the invention, support tube 11 and coil holder 23 are composed, in such case, of the same, especially magnetically conductive, material. Support tube 11 and, as a result, also the coil holder 23 for the at least one field coil 21, can, for example, be made of a magnetically conductive material, such as e.g. steel or another metal. In an additional embodiment of the invention, it is further provided, that the support tube 11 is made, at least partially, of a cast metal, especially a cast iron and/or, at least partially, of a sintered metal. Equally, also the coil holder 23 for the at least one field coil 21 is composed, at least partially, of a cast metal, especially a cast iron and/or, at least partially, a sintered metal. For the above-described case, in which flanges 4, 5 are provided on the measuring tube 1, these can, in advantageous manner, then likewise be connected joint-freely with the support tube 11. In such case, support tube 11, coil holder 23 and flanges 4, 5 can equally, at least partially, be made, in each case, of the same material, especially a cast or sintered, material. Alternatively, or in supplementation, it is additionally, however, also possible, to embody other components (for example, assembly aids, holders or stops for further add-on parts of the measuring transducer), in equal manner as for the at least one coil holder 23, as integral components of the measuring tube and to form them equally joint-freely on the measuring tube 1, especially on the, on occasion, present, support tube 11.

In consideration of the fact that, in the case of measuring transducers of the described kind, and such as also shown in the example of an embodiment according to FIGS. 1b, 1c, the magnetic field system usually includes two field coils, through which, during operation, at least at times, an electrical exciter current flows, especially two field coils, which are of essentially equal construction, the measuring transducer has, in a corresponding further development of the invention, besides the coil holder 23 serving for holding field coil 21 externally on the measuring tube 1, another coil holder 24 serving for holding a second field coil 22 externally on the measuring tube 1. As evident from the combination of FIGS. 2a, b and c, in the example of an embodiment illustrated here, a diameter of the measuring tube 1 connecting the two measuring electrodes is essentially perpendicular to a diameter of the measuring tube 1 connecting the field coils 21, 22, or their associated coil holders 23, 24. In an additional embodiment of this further development of the invention, each of the two, especially essentially equally-constructed, coil holders 23, 24 is equally constructed as an integral component of the measuring tube 1 and is, in each case, connected joint-freely with the measuring tube 1. Additionally, in such case, also an additional pole shoe, especially a pole shoe constructed in equal manner as pole shoe 27, can be provided in the measuring transducer appropriately corresponding with the coil holder 24 for the field coil 22.

In an additional embodiment of the invention, it is further provided, that the at least one field-conducting element 25 is, in each case, in the above described manner, magnetically coupled, especially also mechanically connected, with the coil holder 23 for the first of the two field coils 21, 22 and equally also with the coil holder 24 for the second of the two field coils 21, 22.

For affixing the coil bodies 211, 221 and, as a result, the field coils 21, 22 respectively carried thereby, on the measuring tube 1 in the case of magnetic field system 2, additionally provided are appropriate clamp- and/or holding-apparatuses. For such purpose, another option, especially in the case of a magnetic field system according to the example of an embodiment shown in FIGS. 1b, 1c, the at least one field conducting element 25, the coil holders, as well as the coil bodies are so matched dimensionally to one another, that the two field coils 21, 22 are at least partially held pressed against the measuring tube by means of the at least one field-conducting element. Especially, the at least one field-conducting element 25 is so made, in such case, that, in the installed state of the magnetic field system, it lies simultaneously against the contacted end face, as well as also on a suitable, on occasion, also lateral support giving, bearing surface, of the respective coil body and presses this so against the measuring tube 10 holdingly, such that it is, at least sectionally, elastically clamped. In other words, in such case, the at least one field-conducting element 25 is, at least partially, permanently elastically strained and, thus, durably subjected to such mechanical stresses, that it is held permanently elastically deformed, as compared to an initial state.

Figure 3:
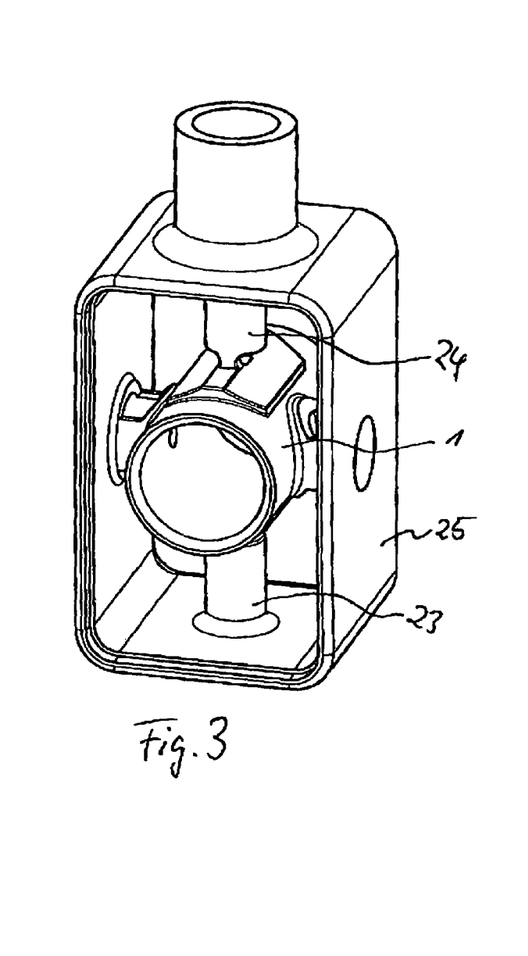
FIG. 3 schematically, a further variant of a magneto-inductive measuring transducer in perspective, side view.
Figure 4A:
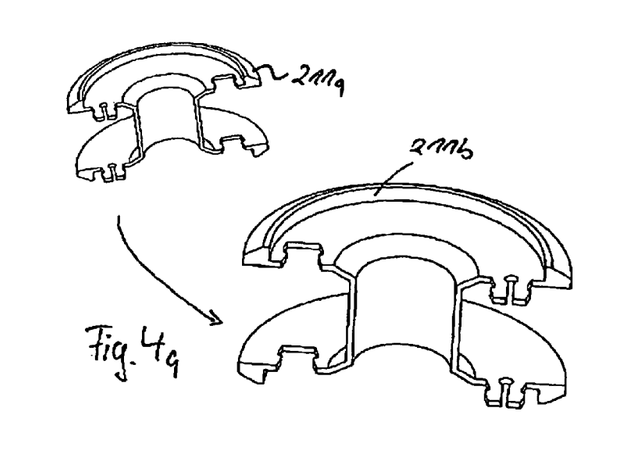
FIGS. 4a, 4b schematically, an embodiment of a coil body of a field coil for a magneto-inductive measuring transducer.
Figure 4B:
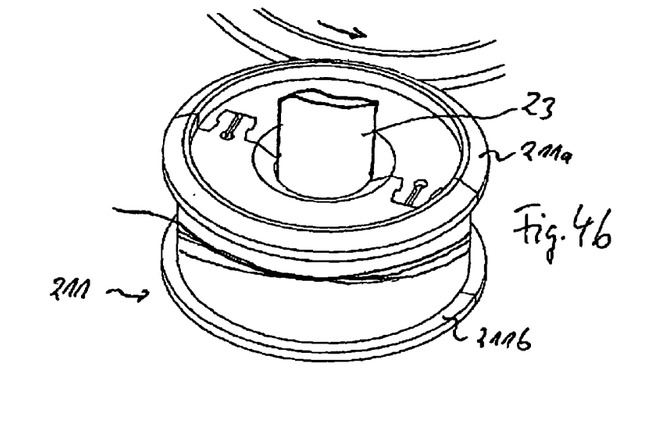

In another embodiment of the invention, it is additionally provided, that, as schematically illustrated in FIG. 3, the at least one coil holder 23 is also connected joint-freely with the at least one field conducting element 25. In the case of such an embodiment of the measuring transducer of the invention, thus, the measuring tube, together with the at least one coil holder and the at least one field conducting element, are manufactured, in advantageous manner, as a single cast part. The seating of the at least one field coil 21 can, especially in the case of this embodiment of the invention, be accomplished, for example, in simple manner, by providing that the at least one coil body 211 is, as schematically illustrated in FIG. 4a, composed of at least two body portions 211a, 211b, which are then appropriately assembled directly on the coil holder. The coil wire, in turn, can then be subsequently applied on the in-situ assembled coil bodies e.g. by affixing the coil wire first sectionally on the coil bodies and then causing the latter, such as schematically illustrated in FIG. 4b, to rotate by the action of an externally electric motor driven friction wheel, which is appropriately brought via its running surface into contact with a peripheral region of the coil body, and, as a result of this, the coil wire is appropriately wound.

The invention claimed is:

1. A magneto-inductive measuring transducer for a fluid flowing in a pipeline, comprising
   a measuring tube for conveying the fluid;
   a measuring electrode arrangement for registering electric voltages produced in the flowing fluid,
   a magnetic field system applied on the measuring tube for producing a magnetic field at least partially passing through the measuring tube as well as fluid conveyed therein during operation, which magnetic field system includes at least one field coil through which an electrical exciter current flows, at least at times during operation; and
   a coil holder serving for holding said at least one field coil externally on said measuring tube and embodied as an integral component of said measuring tube, wherein:
   said measuring tube and said coil holder are connected joint-freely with one another.

2. The measuring transducer as claimed in claim 1, wherein:
   said measuring tube includes a support tube, especially a metal support tube, which supports said coil holder externally.

3. The measuring transducer as claimed in claim 2, wherein:
   said support tube is lined internally with a liner of electrically insulating material, especially a synthetic material, or plastic.

4. The measuring transducer as claimed in claim 2, wherein:
   said support tube and/or said coil holder comprise(s) a cast metal, especially a cast iron.

5. The measuring transducer as claimed in claim 2, wherein:
   said support tube and/or said coil holder comprise(s) a sintered metal.

6. The measuring transducer as claimed in claim 2, wherein:
said support tube and said coil holder comprise a same material, especially magnetically conductive, material.

7. The measuring transducer as claimed in claim 2, wherein:
said support tube has, on an inlet-side end, a first flange and, on an outlet-side end, a second flange.

8. The measuring transducer as claimed in claim 7, wherein:
each of said two flanges is connected joint-freely with said support tube.

9. The measuring transducer as claimed in claim 7, wherein:
said support tube and said flanges comprise the same material.

10. The measuring transducer as claimed in claim 1, wherein:
said measuring tube has, on an inlet-side end, a first flange and, on an outlet-side end, a second flange.

11. The measuring transducer as claimed in claim 10, wherein:
each of said two flanges is connected joint-freely with said measuring tube.

12. The measuring transducer as claimed in claim 1, wherein:
said coil holder comprises a magnetically conductive material.

13. The measuring transducer as claimed in claim 1, wherein:
said coil holder is embodied as a coil core conveying the magnetic field of said at least one field coil.

14. The measuring transducer as claimed in claim 1, wherein:
said coil holder has at least one eddy-current reducing, or preventing, air gap.

15. The measuring transducer as claimed in claim 14, wherein:
said at least one air gap provided in said coil holder extends essentially perpendicularly to a longitudinal axis of said measuring tube.

16. The measuring transducer as claimed in claim 14, wherein:
said coil holder has a plurality of eddy-current reducing, or preventing, air gaps, especially air gaps extending essentially parallel relative to one another.

17. The measuring transducer as claimed in claim 16, wherein:
said air gaps are embodied, relative to one another, as essentially coaxial, annular gaps.

18. The measuring transducer as claimed in claim 1, wherein:
said at least one coil holder is formed by means of a plurality of projections, especially rod-, sleeve- or lamellar projections, connected with said measuring tube.

19. The measuring transducer as claimed in claim 18, wherein:
said coil holder forming projections are spaced laterally from one another to form intermediate spaces, especially air gaps.

20. The measuring transducer as claimed in claim 1, further comprising:
a magnetic field focusing, pole shoe in a transitional region between said coil holder and said measuring tube.

21. The measuring transducer as claimed in claim 20, wherein:
said pole shoe is formed by means of a local thickening of the measuring tube wall, especially a thickening provided externally in the transitional region.

22. The measuring transducer as claimed in claim 20, wherein:
said pole shoe is formed by means of a local recessing of said measuring tube wall, especially a recessing provided externally in the transitional region.

23. The measuring transducer as claimed in claim 1, wherein:
said magnetic field system further comprises at least one, self-closing, field-guiding element guiding the magnetic field externally around said measuring tube.

24. The measuring transducer as claimed in claim 23, wherein:
said at least one coil holder is also connected joint-freely with said at least one field guiding element.

25. The measuring transducer as claimed in claim 1, wherein:
said magnetic field system has two field coils, especially essentially equally embodied field coils, through which an electrical exciter current flows, at least at times during operation.

26. The measuring transducer as claimed in claim 25, further comprising:
a first coil holder serving for holding a first field coil of said magnetic field system externally on said measuring tube, as well as a second coil holder serving for holding a second field coil of said magnetic field system externally on said measuring tube.

27. The measuring transducer as claimed in claim 26, wherein:
each of said two coil holders, especially essentially equally-constructed, coil holders, is embodied as an integral component of said measuring tube and, in each case, is connected joint-freely with said measuring tube.

* * * * *